United States Patent
Nakamoto

(10) Patent No.: US 10,340,847 B2
(45) Date of Patent: Jul. 2, 2019

(54) POWER SUPPLY CONTROL CIRCUIT, ENERGY HARVESTING DEVICE, AND CONTROL METHOD OF ENERGY HARVESTING DEVICE

(71) Applicant: FUJITSU LIMITED, Kawasaki-shi, Kanagawa (JP)

(72) Inventor: Hiroyuki Nakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 15/715,869

(22) Filed: Sep. 26, 2017

(65) Prior Publication Data
US 2018/0152137 A1 May 31, 2018

(30) Foreign Application Priority Data
Nov. 25, 2016 (JP) .................. 2016-229083

(51) Int. Cl.
| | | |
|---|---|---|
| *H02S 40/38* | (2014.01) | |
| *H04B 7/00* | (2006.01) | |
| *H02J 7/35* | (2006.01) | |
| *H02J 7/00* | (2006.01) | |

(52) U.S. Cl.
CPC .......... *H02S 40/38* (2014.12); *H02J 7/0024* (2013.01); *H02J 7/35* (2013.01); *H04B 7/00* (2013.01); *Y02P 90/50* (2015.11)

(58) Field of Classification Search
CPC ........ H02M 3/1563; H02M 2001/0025; G05F 1/562
USPC ........................................... 320/102
See application file for complete search history.

(56) References Cited

U.S. PATENT DOCUMENTS

| | | | | |
|---|---|---|---|---|
| 5,912,560 | A * | 6/1999 | Pasternak ............ | H03K 17/063 307/110 |
| 6,160,441 | A * | 12/2000 | Stratakos ........... | G01R 19/0092 327/52 |
| 6,266,260 | B1 * | 7/2001 | Zahrte, Sr. .............. | H02J 9/062 363/132 |
| 6,680,463 | B2 * | 1/2004 | Honda .................... | F16L 47/03 156/274.2 |
| 9,101,777 | B2 * | 8/2015 | John ..................... | A61N 1/3785 |
| 9,129,554 | B2 * | 9/2015 | Kim ......................... | G09G 3/32 |
| 9,379,543 | B2 * | 6/2016 | Keysar ...................... | H02J 1/00 |
| 9,590,497 | B2 * | 3/2017 | Savulak .................. | H02M 3/04 |
| 9,595,893 | B2 * | 3/2017 | Ocalan ................. | H02N 11/002 |
| 10,033,304 | B2 * | 7/2018 | Feng ..................... | H02N 2/181 |

(Continued)

FOREIGN PATENT DOCUMENTS

| | | |
|---|---|---|
| JP | 61-070433 U | 5/1986 |
| JP | 04-077015 | 3/1992 |
| JP | 2016-146156 | 8/2016 |

*Primary Examiner* — M Baye Diao
(74) *Attorney, Agent, or Firm* — Fujitsu Patent Center

(57) ABSTRACT

A power supply control circuit includes: a power supply control switch provided between a load and a capacitor which stores power from an energy harvester in which a plurality of power generation cells are coupled in series and supplies stored power to the load and configured to select whether or not to supply the stored power in the capacitor to the load; and a controller configured to control the power supply control switch based on a first potential extracted from a first coupling node of the plurality of power generation cells and a second potential extracted from a second coupling node different from the first coupling node.

15 Claims, 12 Drawing Sheets

(56) References Cited

U.S. PATENT DOCUMENTS

| | | | | |
|---|---|---|---|---|
| 10,145,741 B2* | 12/2018 | Nishino | ............... | G01J 5/0003 |
| 10,145,885 B2* | 12/2018 | Terada | ............... | G01R 31/025 |
| 10,148,065 B2* | 12/2018 | Tsunoda | ............... | H01S 5/042 |
| 2016/0226381 A1* | 8/2016 | Gao | ............... | H02M 3/1563 |
| 2017/0179715 A1* | 6/2017 | Huang | ............... | H02M 3/07 |
| 2018/0034279 A1* | 2/2018 | Frenila | ............... | G01R 21/00 |

* cited by examiner

POWER SUPPLY CONTROL CIRCUIT, ENERGY HARVESTING DEVICE, AND CONTROL METHOD OF ENERGY HARVESTING DEVICE

CROSS-REFERENCE TO RELATED APPLICATION

This application is based upon and claims the benefit of priority of the prior Japanese Patent Application No. 2016-229083, filed on Nov. 25, 2016, the entire contents of which are incorporated herein by reference.

FIELD

The embodiment discussed herein is related to a power supply control circuit, an energy harvesting device, and a control method of an energy harvesting device.

BACKGROUND

In energy harvesting, power is obtained by harvesting energy such as sunlight, illumination light, or temperature difference (heat).

Examples of the related art include Japanese Laid-open Patent Publication No. 2016-146156, Japanese Laid-open Patent Publication No. 61-070433, or Japanese Laid-open Patent Publication No. 04-077015.

SUMMARY

According to an aspect of the embodiment, a power supply control circuit includes: a power supply control switch provided between a load and a capacitor which stores power from an energy harvester in which a plurality of power generation cells are coupled in series and supplies stored power to the load and configured to select whether or not to supply the stored power in the capacitor to the load; and a controller configured to control the power supply control switch based on a first potential extracted from a first coupling node of the plurality of power generation cells and a second potential extracted from a second coupling node different from the first coupling node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
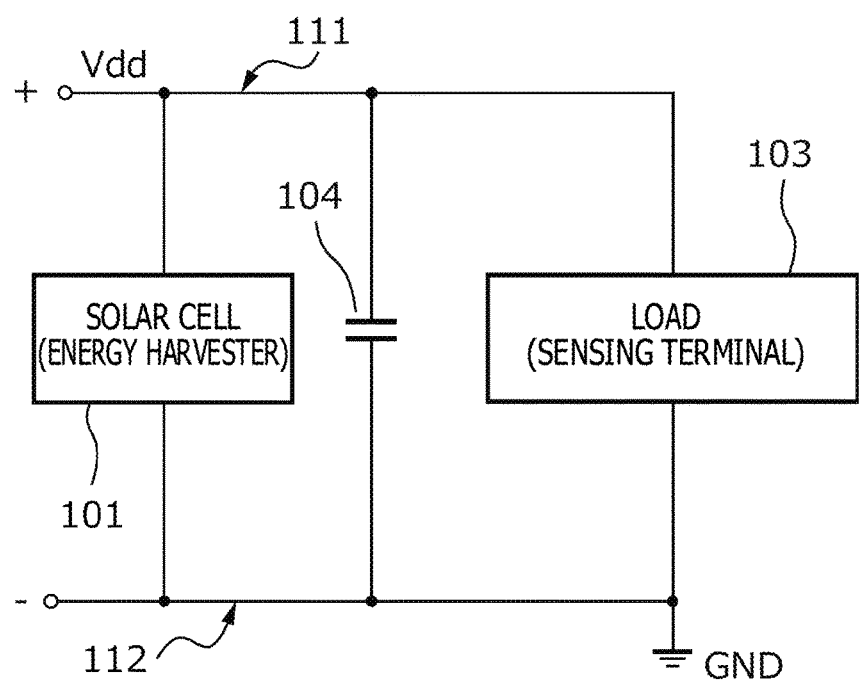
FIG. 1 illustrates one example of an energy harvesting device.

An energy harvesting technique might be applied to wireless sensor networks (WSN) in which a large number of wireless sensors are disposed and pieces of information from the respective wireless sensors are collected, for example.

For example, by utilizing power by an energy harvester as a power supply of a sensing terminal (wireless sensor node) obtained by attaching a sensor to a wireless communication module, the interval of battery replacement might become long or battery replacement might become unnecessary. Such a sensing terminal is attracting attention as a technique that supports the Internet of Things (IoT) and it is predicted that approximately 30 billion sensing terminals are provided in 2020.

For example, in the sensing terminal, maintenance such as installment and battery replacement is carried out. However, it is difficult to manage an enormous number of sensing terminals. For example, the lifetime of the battery may be extended or the trouble of battery replacement may be reduced. Thus, by using an energy harvester that converts energy from an environment to power, battery replacement may become unnecessary. For example, among energy harvesters, the solar cell allows high generated power and has high practicality as a power supply serving as a substitute for the battery.

The power generated by the solar cell varies depending on the brightness of the surroundings. In order to operate an all-purpose integrated circuit (IC) such as a wireless communication module by using unstable, minute power, a power supply control circuit may be applied that primarily stores power for activation of the wireless communication module, monitors the power storage state and carries out switching from the power storing to use of the power when the stored power is sufficient.

For example, various power supply control circuits are provided as the power supply control circuit of an energy harvesting device.

For example, power by energy harvesting may be utilized as a power supply of a sensing terminal. For example, stable power might not be obtained because the output power of the energy harvester is very low. For example, various power supply control circuits that are provided with a comparator, a switch element, a power supply filter, or the like and output stable power while reducing the occurrence of repetition of activation (chattering) in association with insufficiency of power might be provided. However, a problem might exist in terms of the power consumption and so forth.

For example, to drive a wireless communication module (sensing terminal) or the like by using a solar cell (energy harvester), a power supply control circuit is applied that stores minute power, monitors the power and carries out control to make switching from the power storing to use of the power after detecting that the stored power is sufficient. For example, in a power supply control circuit using a comparator that monitors the activation voltage and a comparator that monitors insufficiency of power, the power consumption might become high because a through-current at the time of state transition of the comparator or a steady current for generating a reference voltage flows.

In the following, mainly a solar cell module in which plural solar cell elements are stacked (coupled in series) will be exemplified as an energy harvester. However, the embodiment is not limited to the solar cell module. The energy harvester may be e.g. a thermoelectric generator device in which thermoelectric generator (TEG) cells are stacked or the like.

FIG. 1 illustrates one example of an energy harvesting device. As illustrated in FIG. 1, for example, the energy harvesting device includes an energy harvester 101 such as a solar cell and a capacitor 104 that stores power from the energy harvester 101 and supplies power to a load 103. For example, the capacitor 104 and the load 103 are provided in parallel between a higher-potential-side power supply line (Vdd) 111 and a lower-potential-side power supply line (GND) 112 of the energy harvester (solar cell) 101 and the load 103 is driven by the power stored in the capacitor 104.

In the following, as the energy harvester 101, a solar cell (solar cell module) with which the photovoltaic effect is utilized and optical energy such as sunlight or illumination light is directly converted to power will be described as one example. However, the embodiment is not limited thereto. For example, the energy harvester 101 may be e.g. a thermoelectric generator device that generates power by utilizing temperature difference (Seebeck effect) or the like besides the photoelectric generator that utilizes optical energy.

For example, minute voltage obtained from the energy harvester 101, e.g. a voltage of approximately several tens of millivolts to several hundreds of millivolts, may be boosted by a DC-DC converter not shown in FIG. 1, and the boosted voltage, e.g. a voltage of approximately several volts, may be applied to the load 103. For example, as the load 103, various electronic circuits and pieces of electronic equipment such as a wireless sensor node (sensing terminal) of wireless sensor networks may be applied.

Figure 2:
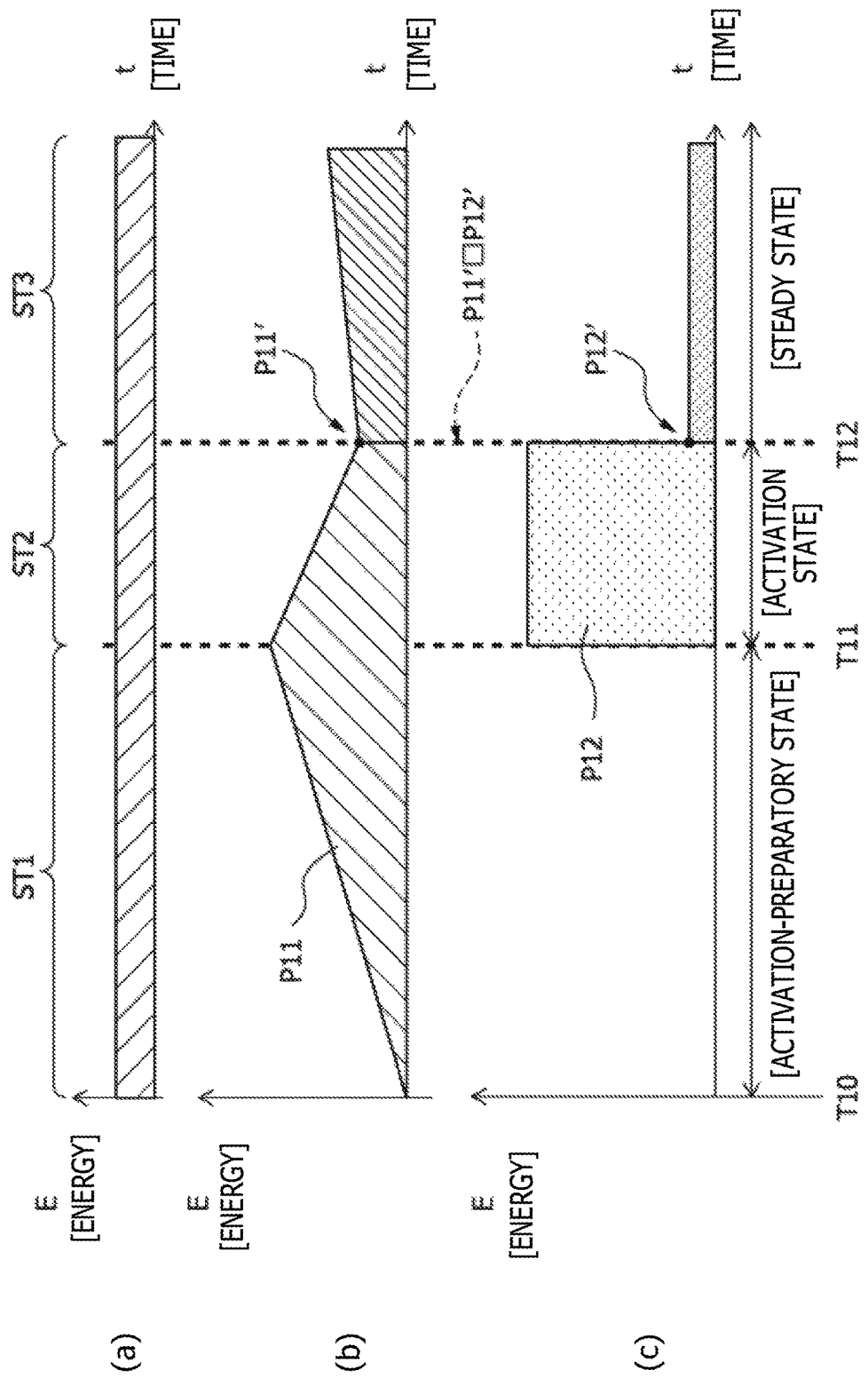
FIG. 2 illustrates one example of operation of an energy harvesting device.

FIG. 2 illustrates one example of operation of an energy harvesting device. The operation illustrated in FIG. 2 may be operation of the energy harvesting device illustrated in FIG. 1. FIG. 2(a) illustrates the time change of energy generated by the solar cell (energy harvester) 101. FIG. 2(b) illustrates the time change of energy held (stored) by the capacitor 104. FIG. 2(c) illustrates the time change of energy consumed by the load 103. In FIG. 2(a) to FIG. 2(c), the vertical axis indicates the energy (E) and the horizontal axis indicates the time (t).

T10 represents an energy storing start time at which storing of the energy by the solar cell 101 in the capacitor 104 is started. T11 represents an activation start time at which the load 103 starts activation. T12 represents a steady state start time at which the load 103 starts a steady state after being activated. ST1 represents an activation-preparatory state from the energy storing start time T10 to the activation start time T11. ST2 represents an activation state from the activation start time T11 to the steady state start time T12. ST3 represents a steady state subsequent to the steady state start time of T12.

As illustrated in FIG. 2(a), for example, if continuously receiving steady optical energy, the solar cell 101 continuously outputs steady generated energy, e.g. energy of several hundreds of microjoules (μJ), irrespective of change in the time. For example, the solar cell 101 outputs steady generated energy over all periods of the activation-preparatory state ST1, the activation state ST2, and the steady state ST3.

As illustrated in FIG. 2(b), the energy (charge) held by the capacitor 104 is all stored in the capacitor 104 without being consumed and therefore gradually increases in the period from the time T10 to T11 (ST1). When the energy held by the capacitor 104 reaches given activation-enabling energy at the time T11, the load 103 starts activation if a voltage Vdd applied to the load 103 becomes a given voltage (threshold voltage) or higher, for example.

After the load 103 starts the activation, the energy held by the capacitor 104 is consumed due to the activation of the load 103 and therefore gradually decreases in the period from the time T11 to the time T12 (ST2). For example, the energy consumed by the load 103 in the steady state is assumed to be P12'. At T12, if the energy (P11') held in the capacitor 104 becomes higher than P12', the load 103 makes transition to the steady state.

As illustrated in FIG. 2(c), the load 103 consumes energy far higher than that in the steady state, e.g. energy of several millijoules (mJ), in the period of the activation state ST2. In the period of the steady state ST3, the load 103 consumes given power, e.g. power of several tens of μW (J/s), in order to transmit and receive signals between the load 103 and a base station, for example. For example, if the load (sensing terminal) 103 is driven by the solar cell (energy harvester) 101, the sensing terminal 103 wirelessly transmits information on the temperature, humidity, and so forth to the base station intermittently, for example.

In order to reduce the power consumption, in the sensing terminal 103, intermittent operation may be carried out in which the sensing terminal 103 is set active (on-state) only when transmitting and receiving signals between the sensing terminal 103 and the base station and is made to sleep (off-state) in the other period. However, the output power of the energy harvester 101 is very low and it might be difficult to obtain stable power. In order to activate the load 103, the capacitance of the capacitor 104 might be set high for causing the energy P11 stored by the time T11 to be higher than the energy P12 consumed in the activation state. For this reason, the occupation area of the circuit might become large and reduction in the thickness and size might become difficult.

Figure 3A:
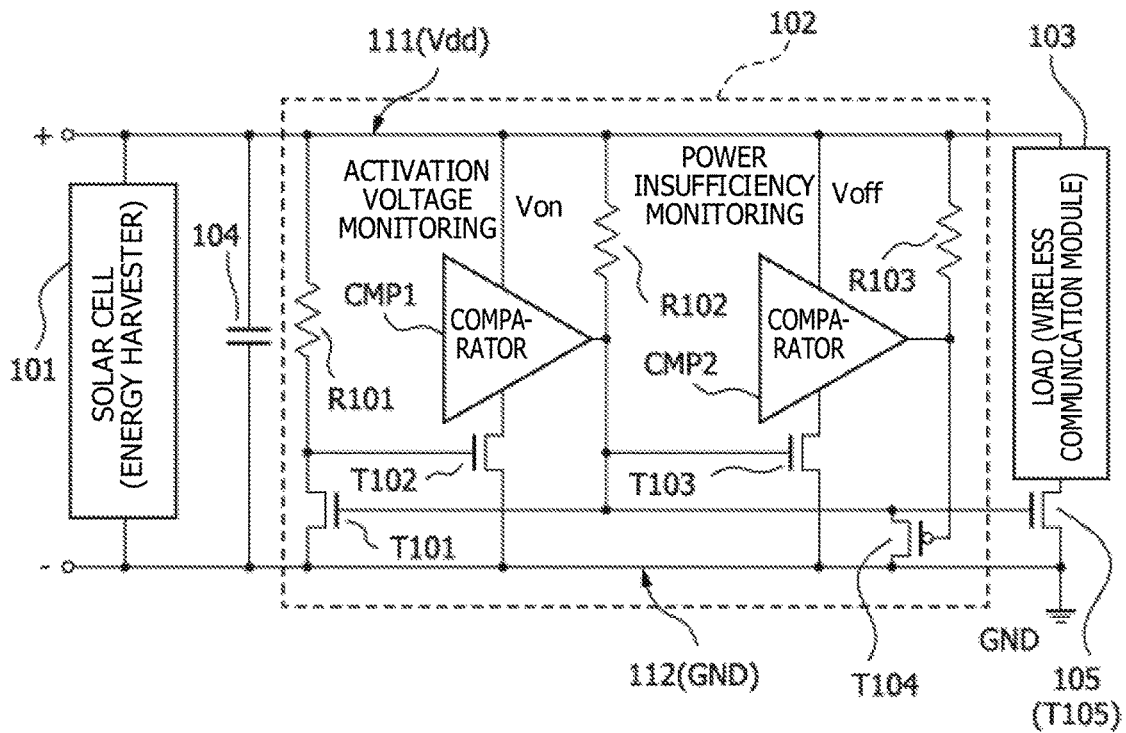
FIG. 3A illustrates one example of an energy harvesting device.
Figure 3B:
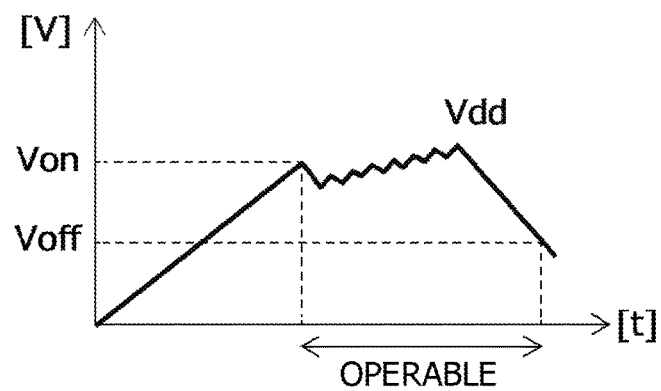
FIG. 3B illustrates one example of operation of an energy harvesting device.

FIG. 3A illustrates one example of an energy harvesting device and FIG. 3B illustrates one example of an operation of the energy harvesting device. As illustrated in FIG. 3A, the energy harvesting device is a device for driving the load (wireless communication module) 103 and includes a power supply control switch 105 and a control unit 102 in addition to the solar cell (energy harvester) 101 and the capacitor 104 as illustrated in FIG. 1.

The power supply control switch 105 is provided in series to the wireless communication module 103 between the higher-potential-side power supply line 111 and the lower-potential-side power supply line 112. For example, supply and blocking of power to the load 103 are controlled based on the on/off-state of the power supply control switch 105. The control unit 102 includes pull-up resistors R101, R102, and R103 coupled to the higher-potential-side power supply line 111, comparators CMP1 and CMP2, and switches T101 to T104. The power supply control switch 105 (T105) and the switches T101 to T103 of the control unit 102 may be n-channel metal-oxide-semiconductor (nMOS) transistors and the switch T104 may be a p-channel MOS (pMOS) transistor.

The comparators CMP1 and CMP2 monitor a supply voltage (voltage of the higher-potential-side power supply line 111) Vdd and controls the on/off-state of the power supply control switch 105 through the switches T101 to T104. For example, the comparator CMP1 is a comparator for monitoring activation voltage to operate the wireless communication module 103 by turning on the power supply control switch 105 through inverting the output of the comparator when the supply voltage Vdd obtained by storing the output of the solar cell 101 in the capacitor 104 rises up to an on-voltage Von. The comparator CMP2 is a comparator for monitoring power insufficiency to stop the wireless communication module 103 through inverting the output of the comparator when the supply voltage Vdd falls down to an off-voltage Voff.

As illustrated in FIG. 3B, when the solar cell 101 receives light and the supply voltage Vdd rises up to the on-voltage Von, the power supply control switch 105 is turned on and the wireless communication module 103 operates. When the supply voltage Vdd falls down to the off-voltage Voff, the power supply control switch 105 is turned off and the wireless communication module 103 stops. As above, in the control unit 102, comparators (in FIG. 3, two comparators CMP1 and CMP2) are used as a circuit that monitors two different voltages to control the on/off-state of the wireless communication module 103 and carries out switching.

Figure 4A:
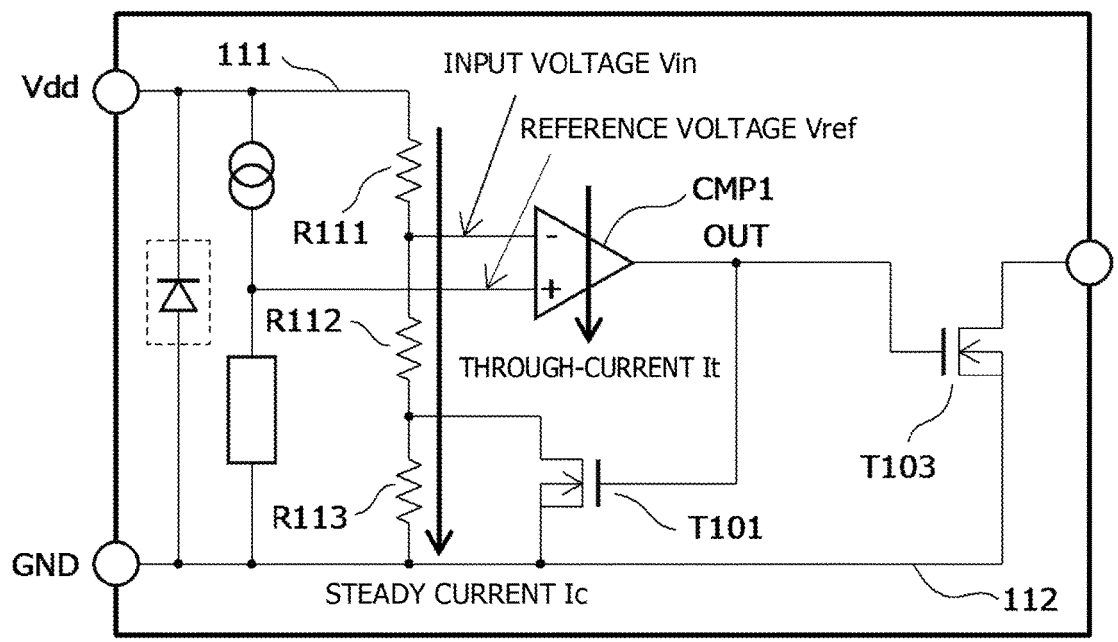
FIG. 4A illustrates one example of a comparator.
Figure 4B:
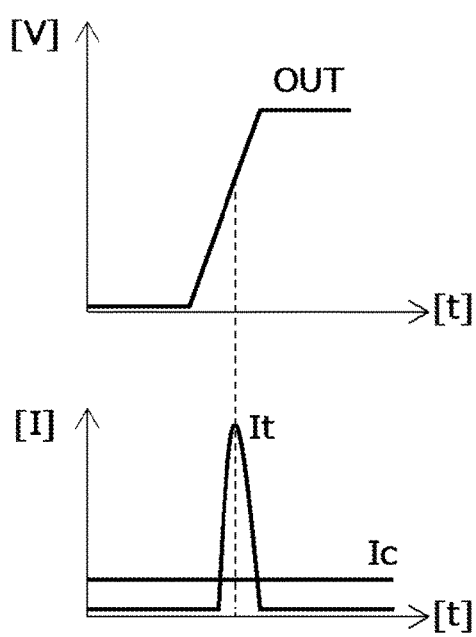
FIG. 4B illustrates one example of voltage and current waveforms of a comparator.

FIG. 4A illustrates one example of a comparator. FIG. 4B illustrates one example of voltage and current waveforms of a comparator. The comparator represented in FIG. 4A and FIG. 4B may be the comparator CMP1 (CMP2) of the energy harvesting device illustrated in FIG. 3. As illustrated in FIG. 4A and FIG. 4B, if the comparator CMP1 is applied to the control unit 102, between the higher-potential-side power supply line 111 and the lower-potential-side power supply line 112, resistors R111, R112, and R113 are provided in series, for example and thus a given steady current (on the order of several µA) Ic consistently flows. When the comparator CMP1 inverts the output ("H"→"L" or "L"→"H"), a large through-current (on the order of mA) It flows at the moment of the inversion.

The currents Ic and It that flow when such a comparator is used might not be ignorable in the energy harvesting device (energy harvester) that treats minute power. For example, when a solar cell is applied as an energy harvester, the current generation capability by the energy harvester often becomes on the order of several µA if the energy harvester is perpendicularly attached to a wall in a factory or under an environment of low illuminance. For this reason, the installment place might be limited.

Figure 5:
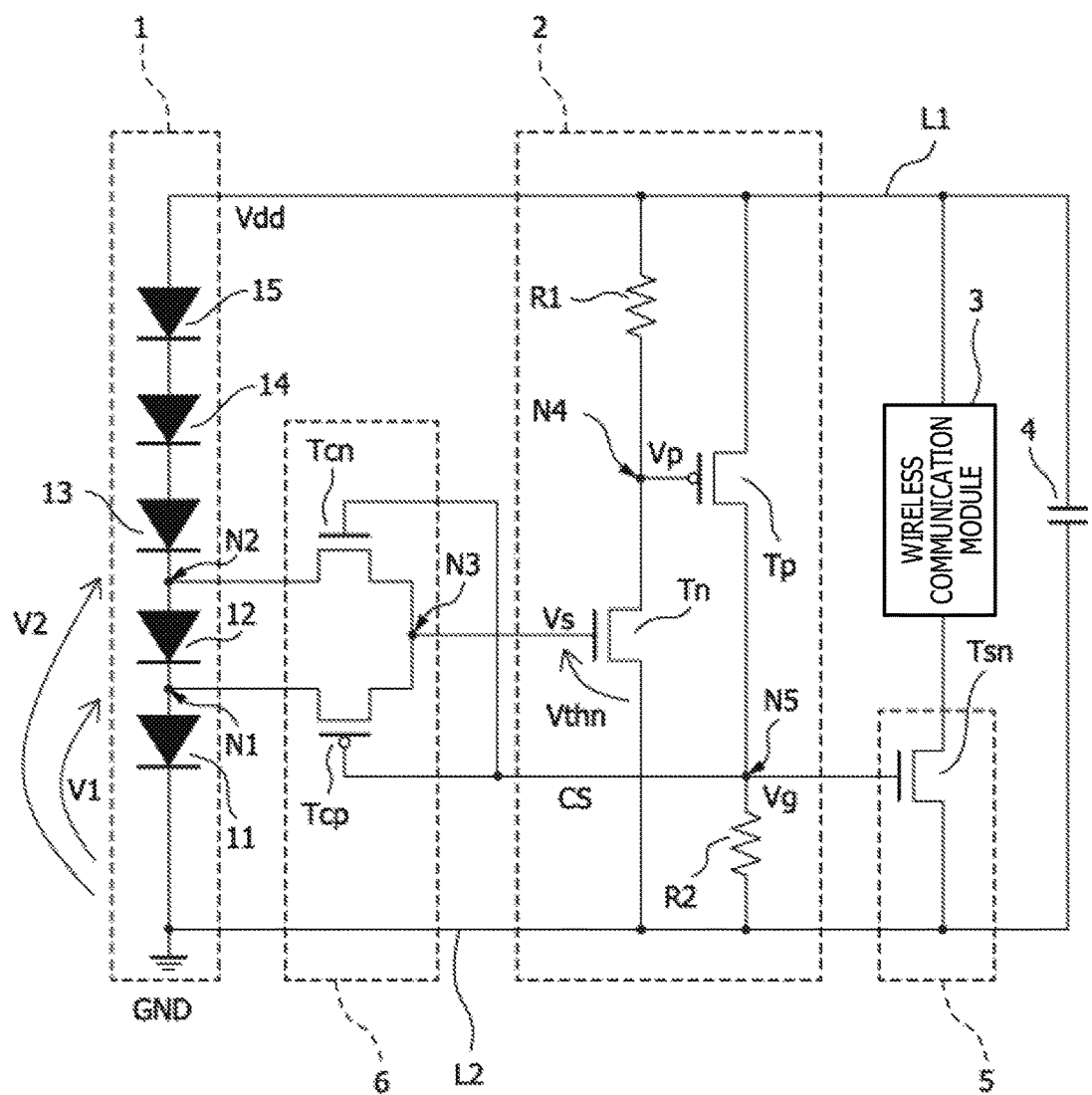
FIG. 5 illustrates one embodiment of an energy harvesting device.

FIG. 5 illustrates one embodiment of an energy harvesting device. The energy harvesting device illustrated in FIG. 5 is a device that supplies power to the wireless communication module (load) 3 and drives the wireless communication module 3, and includes an energy harvester 1, a control unit 2, a capacitor 4, a power supply control switch 5, and a potential selection switch 6.

The energy harvester 1 may be a solar cell (solar cell module) in which plural power generation cells (solar cell elements) 11 to 15 are coupled in series and is not limited to the solar cell. The energy harvester 1 may be e.g. a temperature difference power generator device in which plural TEG cells that generate power by utilizing temperature difference are stacked (coupled in series), or the like. A minute voltage obtained from the energy harvester 1 may be boosted by a DC-DC converter and the boosted voltage, e.g. a voltage of approximately several volts, may be applied to the load 3. The load 3 is not limited to the wireless communication module (sensing terminal) and may be various electronic circuits and pieces of electronic equipment.

In FIG. 5, the five solar cell elements 11 to 15 are coupled in series. However, the number of solar cell elements is not limited to five. The electrical coupling of these five solar cell elements 11 to 15 may be in series and the solar cell elements 11 to 15 themselves may be disposed on the same plane. In order to allow these solar cell elements 11 to 15 to generate power without unevenness, one solar cell element (11 to 15) may be formed as a cell group in which plural cells at scattered positions are coupled in parallel, for example.

The capacitor 4 is provided between a higher-potential power supply line (Vdd) L1 and a lower-potential power supply line (GND) L2 coupled to both terminals of the solar cell module 1. The power supply control switch 5 and the wireless communication module (load) 3 are provided in series between the higher-potential power supply line L1 and the lower-potential power supply line L2. Thus, when the power supply control switch 5 is in the on-state, the wireless communication module 3 is supplied with power stored in the capacitor 4 and operates. When the power supply control switch 5 is in the off-state, the power stored in the capacitor 4 is blocked and the wireless communication module 3 stops the operation.

In the energy harvesting device illustrated in FIG. 5, the power supply control switch 5 coupled in series to the wireless communication module 3 may be an n-channel MOS (nMOS) transistor and a control signal (control voltage) CS from the control unit 2 is input to the control input (gate). The potential selection switch 6 includes an nMOS transistor Tcn and a p-channel MOS (pMOS) transistor Tcp and the control signal CS is input to the gates of these transistors Tcn and Tcp.

One terminal (source) of the transistor Tcp is coupled to a coupling node N1 between the first cell (solar cell element) 11 and the second cell 12 from the side of GND (lower-potential power supply line L2) and extracts a voltage V1 based on the first cell 11. The source of the transistor Tcn is coupled to a coupling node N2 between the second cell 12 and the third cell 13 from GND and extracts a voltage V2 based on the first and second cells 11 and 12.

The other terminals (drains) of the transistors Tcp and Tcn are coupled in common at a node N3 and are connected to the gate of an nMOS transistor Tn. For example, the potential selection switch 6 selects the voltage V1 or V2 and outputs the voltage V1 or V2 to the gate of the transistor Tn based on the control signal CS. For example, the voltage V2 (absolute value of the potential of the node N2) based on two solar cell elements 11 and 12 coupled in series (stacked) is almost twice the voltage V1 (absolute value of the potential of the node N1) based on one solar cell element 11.

The control unit 2 includes the nMOS transistor Tn coupled in series to a resistor (pull-up resistor) R1 and a pMOS transistor Tp coupled in series to a resistor (pull-down resistor) R2 between Vdd (higher-potential power supply line L1) and GND (lower-potential power supply line L2). A coupling node N4 between a transistor, for example, the first transistor Tn, and a pull-up resistor, for example, the first resistor R1, is connected to the gate of a transistor, for example, the second transistor Tp, and the control signal CS is extracted from a coupling node N5 between the transistor Tp and a pull-down resistor, for example, the second resistor R2. This control signal CS is input to the gate of a switch transistor Tsn, for example, the power supply control switch 5, and the gates of the transistors Tcn and Tcp of the potential selection switch 6.

Figure 6:
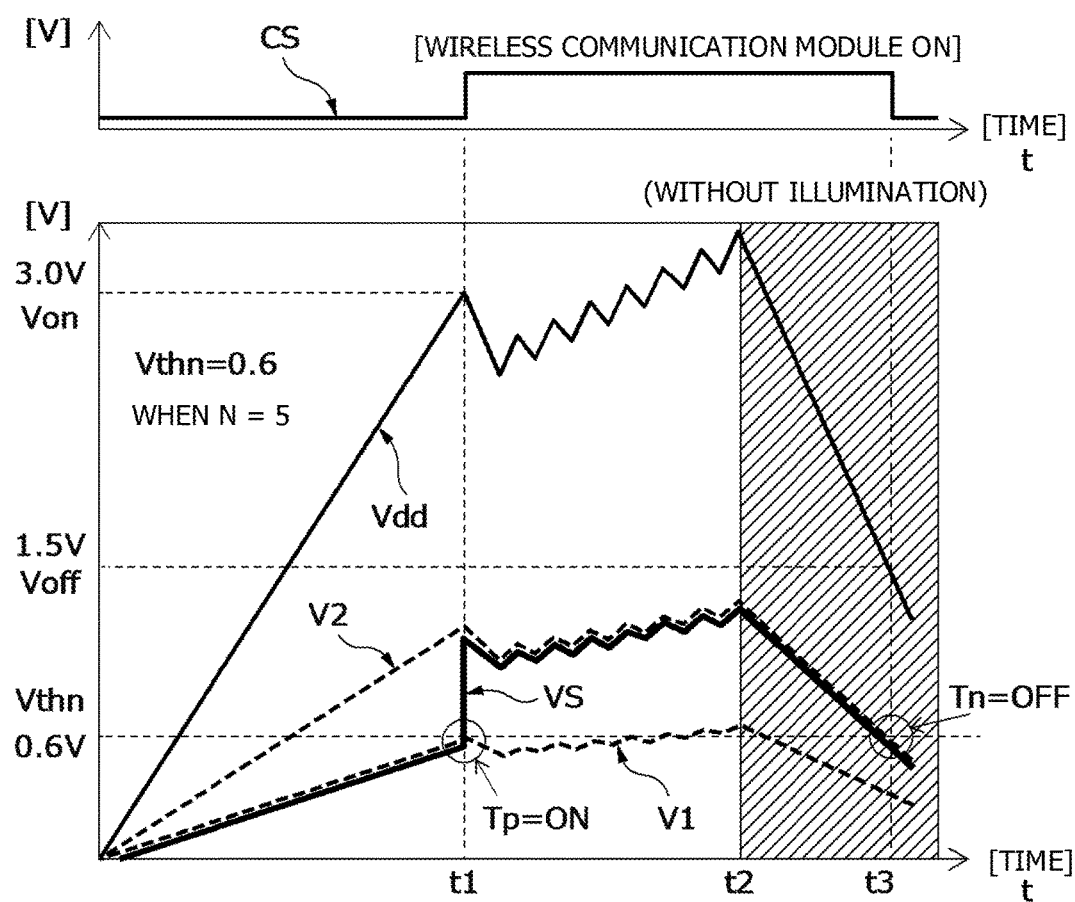
FIG. 6 illustrates one embodiment of operation of an energy harvesting device.

FIG. 6 illustrates one embodiment of operation of an energy harvesting device. The operation illustrated in FIG. 6 may be operation of the energy harvesting device illustrated in FIG. 5. As illustrated in FIG. 6, for example, the solar cell module 1 is irradiated with light until a time t1 and the solar cell module 1 (solar cell elements 11 to 15) generates power and therefore the supply voltage Vdd rises up. For example, the number of solar cell elements may be N and the voltage of the solar cell module 1 may be Vdd. The output potential V1 of the node N1 and the output potential V2 of the node N2 are given by V1=Vdd/N and V2=2·Vdd/N, respectively. As illustrated in FIG. 5, when the solar cell module 1 includes five cells (N=5), the potentials at the time t1 become V1=0.6 V and V2=1.2 V if power generation of Vdd=3.0 V is obtained at the time t1.

In the period until the time t1, a gate voltage Vp of the transistor Tp of the control unit 2 (voltage of the node N4) is pulled up by the resistor R1 and thus becomes Vp=Vdd, and the transistor Tp is turned off. A gate voltage Vg of the switch transistor Tsn (voltage of the node N5, voltage of the control signal CS) is pulled down by the resistor R2 and thus becomes Vg=GND (0 V), and the switch transistor Tsn is turned off.

An output voltage Vs of the potential selection switch 6 (voltage of the node N3) is applied to the gate of the transistor Tn of the control unit 2. Because the control signal CS (Vg) is 0 V until the time t1, the transistor Tcn is in the off-state and the transistor Tcp is in the on-state and thus V1 is applied to the gate of the transistor Tn. For example, Vs=V1 is satisfied until the time t1. The transistor Tn keeps the off-state because a threshold voltage Vthn of the transistor Tn of the control unit 2 is higher than V1 (Vthn>V1). The switch transistor Tsn is in the off-state and therefore the wireless communication module 3 keeps the operation-stopped state.

When the time passes through the time t1, the output voltage Vs of the potential selection switch 6 becomes higher than the threshold voltage Vthn of the transistor Tn of the control unit 2 (Vthn<V1). Thereupon, the transistor Tn is turned on and Vp=GND (0 V) is obtained, so that the transistor Tp is turned on. Thus, the control signal CS (Vg) becomes Vdd and the switch transistor Tsn is turned on, so that the supply voltage Vdd is applied to the wireless communication module 3 and the wireless communication module 3 starts operation (becomes the on-state). Because the control signal CS becomes Vdd, the transistor Tcn of the potential selection switch 6 is turned on and the transistor Tcp is turned off, so that Vs=V2 is obtained. For example, the potential of Vs rises up with the transistor Tn kept on.

As illustrated in FIG. 6, immediately after the time t1, for example, in the activation state in FIG. 2, the wireless communication module 3 consumes high power for initial setting, creation of a protocol stack, and so forth and therefore an instantaneous voltage drop becomes large. Due to the switching of the output of the potential selection switch 6 from V1 to V2, it is possible to allow the energy harvesting device to have a hysteresis. Therefore, for example, the occurrence of chattering and so forth might be reduced and the wireless communication module 3 might stably operate. Thereafter, until a time t2, Vdd gradually rises up if execution of intermittent sensing and wireless communication are carried out under a situation in which the power generated by the solar cell module 1 surpasses the power consumed by the wireless communication module 3.

For example, if the illumination disappears and the power generation becomes impossible immediately after the time t2, the wireless communication module 3 continues the operation while consuming the charge stored in the capacitor 4. Thus, Vdd gradually falls down. When Vs=V2<Vthn is obtained at the time t3, the transistor Tn of the control unit 2 is turned off. Thus, Vp=Vdd is obtained and the transistor Tp is turned off. As a result, Vg=GND (0 V) is obtained and the switch transistor Tsn is turned off. Moreover, the switch is shifted to set Vs=V1 and the energy harvesting device returns to the initial state.

As described above, at the time t1, the wireless communication module 3 is operated (turned on) when the voltage V1 based on one solar cell element 11 surpasses the threshold voltage Vthn of the transistor Tn. Thereafter, instantaneously the gate voltage Vs of the transistor Tn is switched from V1 to V2 based on two solar cell elements 11 and 12, and the operation of the wireless communication module 3 is stopped (turned off) when V2 falls below the threshold voltage Vthn of the transistor Tn. For this reason, for example, without using the comparators CMP1 and CMP2 provided in an energy harvesting device (control unit) as illustrated in FIG. 3 and FIG. 4, the energy harvesting device might be caused to have a hysteresis function and the occurrence of chattering might be eliminated, so that the stable operation of the wireless communication module 3 might become possible.

For example, when N=5 and Vthn=0.6 V are set, V1>0.6 V is satisfied under a condition of Vdd>3.0 V and V2<0.6 V is satisfied under a condition of Vdd<1.5 V. Therefore, the wireless communication module 3 is controlled to be turned on when Vdd>3.0 V is satisfied and be turned off when Vdd<1.5 V is satisfied. This indicates that it is possible for the wireless communication module 3 to be controlled with the on-voltage Von=3.0 V and the off-voltage Voff=1.5 V in the energy harvesting device illustrated in FIG. 5, for example. These potential settings may be changed by adjusting the number of solar cell elements (11 to 15) coupled in series or the voltages between solar cell elements (V1, V2) extracted by the potential selection switch 6.

Because the comparator is made unnecessary as described above, for example, the current consumption might be reduced to almost zero until the time t1, and energy might be stored even under an environment of lower illuminance and the wireless communication module (sensing terminal) 3 might be operated. For example, the sensing terminal might be used without a problem even in the case in which the energy harvester (energy harvesting device) is perpendicularly attached to a wall in a factory and is not directly subjected to illumination, the case in which power generation is carried out with indirect illumination, the case in which the energy harvester (energy harvesting device) is installed under an environment of low illuminance, or the like.

Figure 7:
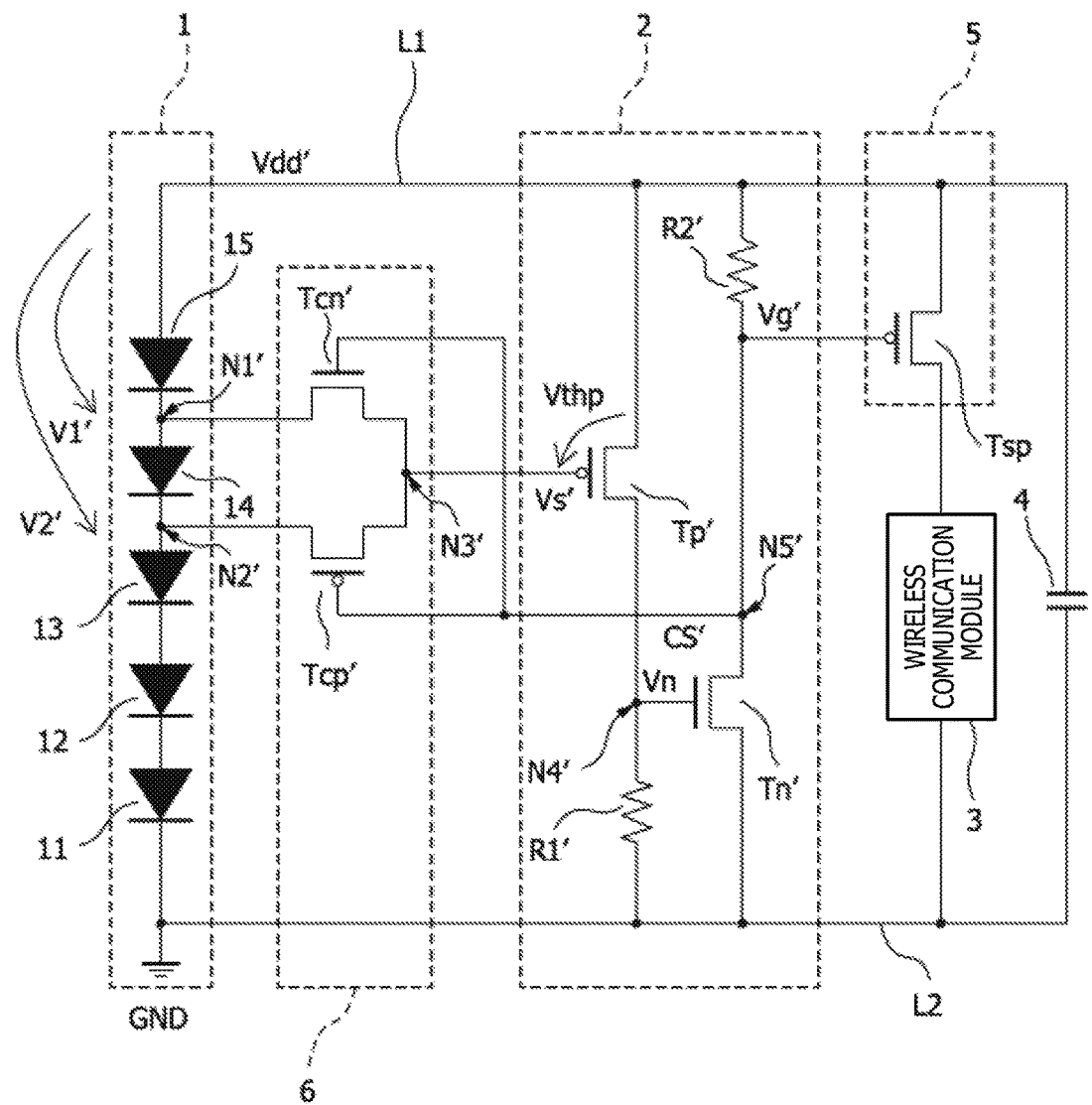
FIG. 7 illustrates one embodiment of an energy harvesting device.
Figure 8:
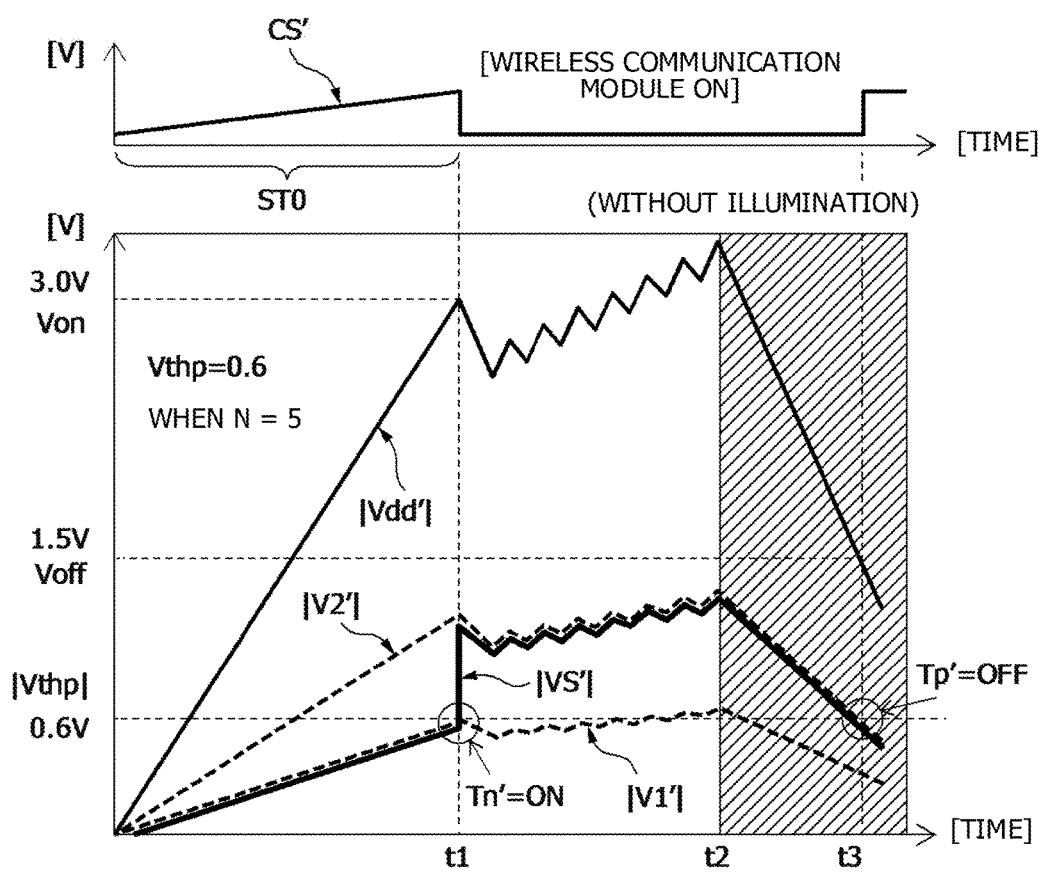
FIG. 8 illustrates one embodiment of operation of an energy harvesting device.

FIG. 7 illustrates one embodiment of an energy harvesting device. FIG. 8 illustrates one example of operation of an energy harvesting device. The operation illustrated in FIG. 8 may be operation of the energy harvesting device illustrated in FIG. 7. The energy harvesting device illustrated in FIG. 7 is equivalent to a device including a complementary structure obtained by inverting the pMOS transistors and the nMOS transistors in the energy harvesting device illustrated in FIG. 5. For example, in FIG. 7, the pMOS transistors Tp and Tcp illustrated in FIG. 5 become nMOS transistors Tn' and Tcn', and the nMOS transistors Tn, Tcn, and Tsn become pMOS transistors Tp', Tcp', and Tsp. In FIG. 7, the pull-up resistor R1 and the pull-down resistor R2 illustrated in FIG.

5 become a pull-down resistor R1' and a pull-up resistor R2'. In FIG. 7, the nodes N1 to N5, the voltages Vdd, Vs, Vp, and Vg, and the control signal CS illustrated in FIG. 5 become nodes N1' to N5', voltages Vdd', Vs', Vn, and Vg', and a control signal CS' respectively.

As described above, in FIG. 7, symbols obtained by adding a dash to symbols corresponding to FIG. 5 are described. The absolute values of the respective voltages Vdd', V1', V2', and Vs', the operation of the transistors Tn' and Tp', and so forth in FIG. 8 correspond to Vdd, V1, V2, and Vs, the operation of the transistors Tp and Tn, and so forth illustrated in FIG. 6, and the description is omitted here. For example, the absolute values |Vdd'|, |V1'|, |V2'|, and |Vs'| of the respective voltages illustrated in FIG. 8 may correspond to Vdd, V1, V2, and Vs illustrated in FIG. 6. As represented by reference symbol ST0 in FIG. 8, the control signal CS' changes in association with the rise of the voltage output by the solar cell module 1 until the time t1. At the time t1, |Vs'|=|V1'|>|Vthp| is satisfied and the transistor Tp' is turned on. In association with this, the potential of N4' becomes Vdd'. Thus, the transistor Tn' of the control unit 2 is turned on and the control signal CS' becomes GND (0 V). Thus, the switch transistor Tsp' is turned on and the wireless communication module 3 becomes the operating state. The output of the potential selection switch 6 is switched from V1' to V2'.

Figure 9:
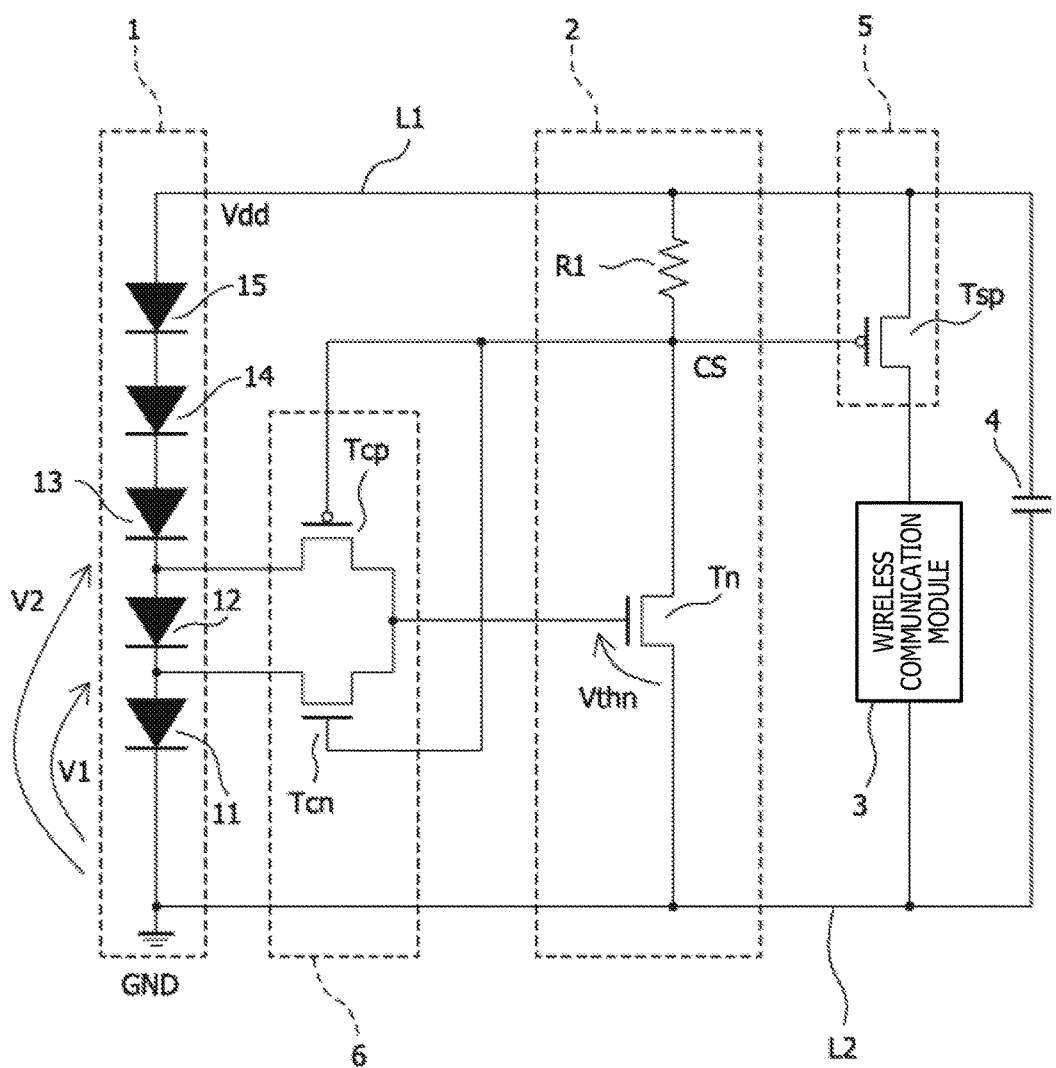
FIG. 9 illustrates one embodiment of an energy harvesting device.
Figure 10:
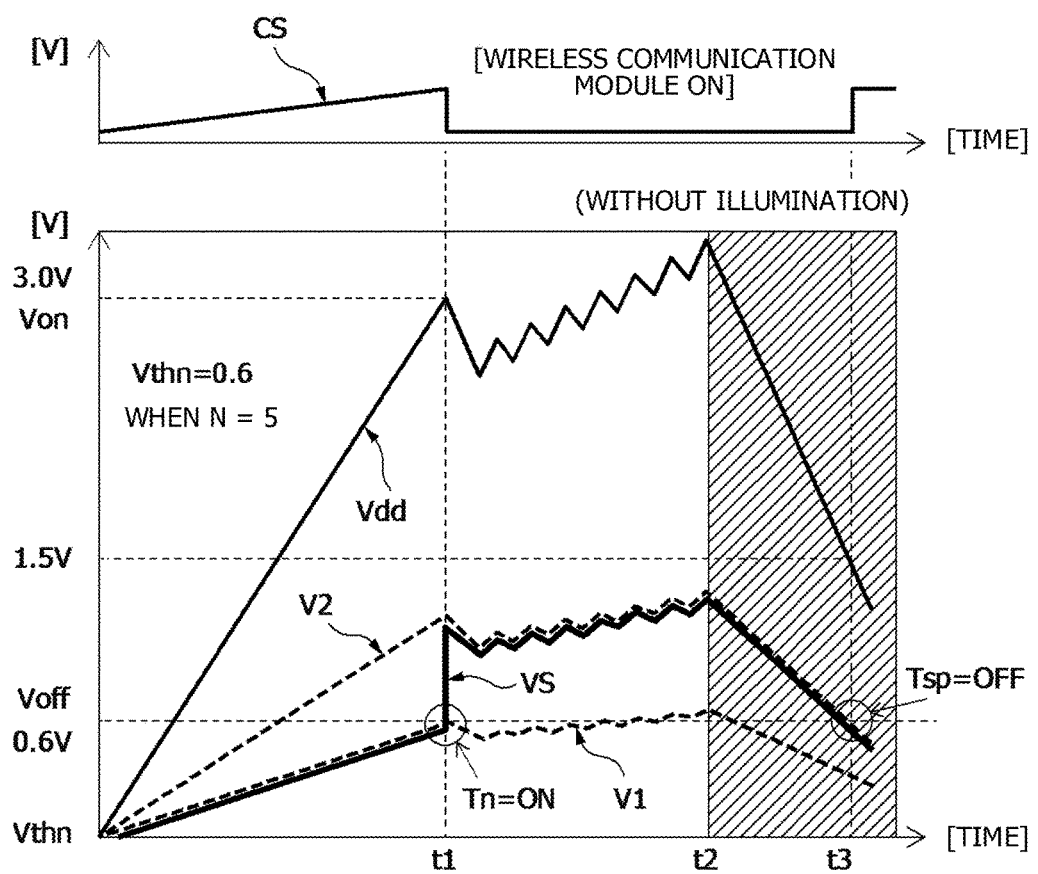
FIG. 10 illustrates one embodiment of operation of an energy harvesting device.

FIG. 9 illustrates one embodiment of an energy harvesting device. FIG. 10 illustrates one example of operation of an energy harvesting device. The operation illustrated in FIG. 10 may be operation of the energy harvesting device illustrated in FIG. 9. In the energy harvesting device illustrated in FIG. 9, the control unit 2 may include a resistor (pull-up resistor R1) and the nMOS transistor Tn. The resistor (first resistor) R1 and the transistor (first transistor) Tn are coupled in series between the higher-potential power supply line L1 and the lower-potential power supply line L2, and the power supply control switch (switch transistor) 5 may be the pMOS transistor Tsp. To the gate of the switch transistor Tsp, the control signal CS extracted from the coupling node between the resistor R1 and the transistor Tn is input. The control signal CS corresponds to the control signal CS' represented in FIG. 7.

According to the energy harvesting device illustrated in FIG. 9, compared with the energy harvesting devices illustrated in FIG. 5 and FIG. 7, one pair of transistor and resistor is reduced because the control unit 2 may include the resistor R1 and the transistor Tn. For example, the current consumption due to the pull-down resistor R2 illustrated in FIG. 5 might be reduced. The operation of the transistor Tn in the control unit 2 is similar to the operation represented in FIG. 6. However, the operation of the switch transistor Tsp is equivalent to the operation represented in FIG. 8, in which the switch transistor is a pMOS transistor.

Figure 11:
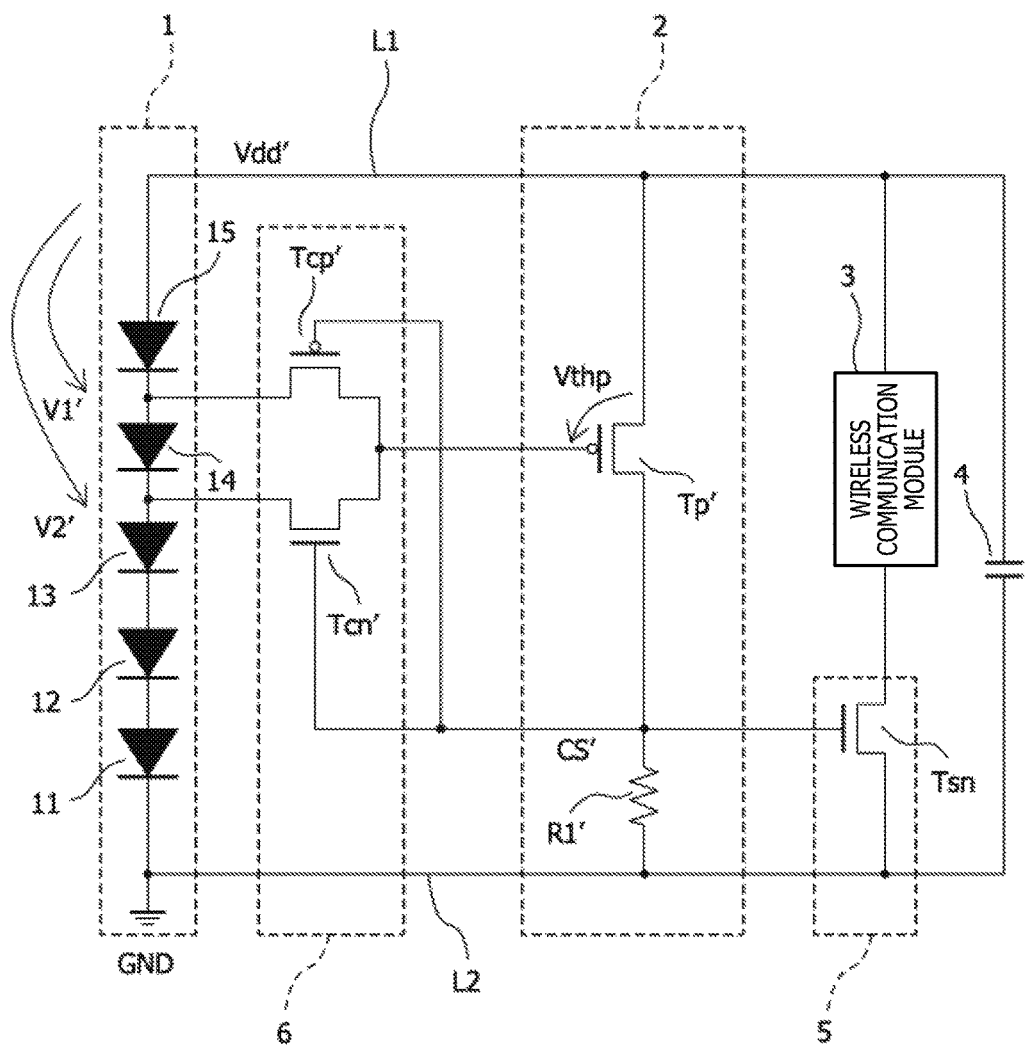
FIG. 11 illustrates one embodiment of an energy harvesting device.
Figure 12:
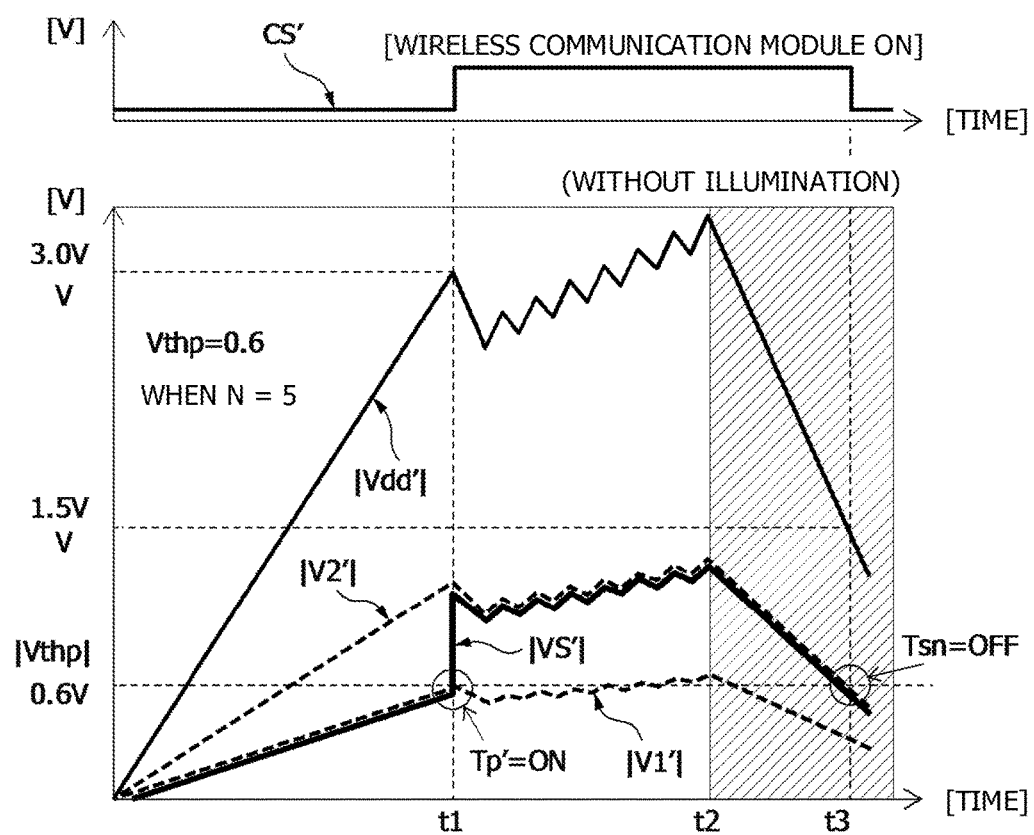
FIG. 12 illustrates one embodiment of operation of an energy harvesting device.

FIG. 11 illustrates one embodiment of an energy harvesting device. FIG. 12 illustrates one example of operation of an energy harvesting device. The operation illustrated in FIG. 12 may be operation of the energy harvesting device illustrated in FIG. 11. The energy harvesting device illustrated in FIG. 11 is equivalent to a device including a complementary structure obtained by inverting the pMOS transistors and the nMOS transistors in the energy harvesting device illustrated in FIG. 9. In FIG. 11, for example, the current consumption due to the pull-up resistor R2' illustrated in FIG. 7 is reduced. The operation of the transistor Tp' in the control unit 2 is similar to the operation represented in FIG. 8. However, the operation of the switch transistor Tsn is equivalent to the operation represented in FIG. 6, in which the switch transistor is an nMOS transistor.

As above, various modifications and changes may be made on the energy harvesting device (power supply control circuit). Because the comparator that steadily consumes power to carry out potential comparison is not used, power generated by the solar cell module might be stored and the wireless communication module might be operated even in an environment of low illuminance equal to or lower than 100 Lux, for example. As the environment of 100 Lux or lower, for example, places in a shadow (shade), places at which indirect illumination is used, and so forth are cited, such as an evacuation passage (approximately 70 Lux), a wall in a building (approximately 50 to 70 Lux), or a place under a shelf (approximately 20 Lux).

For example, the energy harvesting device might be applied even to a place at which illumination light is not directly supplied to the surface of the solar cell (solar cell module), such as a place in which the energy harvesting device is vertically stuck or a place in which the energy harvesting device is stuck on a ceiling so as to be oriented downward. For this reason, wireless communication modules or sensors might operate through storing of minute energy at places at which the energy harvesting device is not installed so far due to darkness, and therefore the application range of IoT services might be extended. Such an effect is not limited to the solar cell and is similar also to an energy harvester in which plural power generation cells such as thermoelectric generator cells are coupled in series. For example, if plural thermoelectric generator cells are applied as an energy harvester, generated power might be stored and a load might be driven even under an environment with a small temperature difference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A power supply control circuit comprising:
   a power supply control switch provided between a load and a capacitor which stores power from an energy harvester in which a plurality of power generation cells are coupled in series and supplies stored power to the load and configured to select whether or not to supply the stored power in the capacitor to the load; and
   a controller configured to control the power supply control switch based on a first potential extracted from a first coupling node of the plurality of power generation cells and a second potential extracted from a second coupling node different from the first coupling node,
   wherein the capacitor is coupled between first and second power supply lines, and the power supply control switch and the load are coupled in series between the first and second power supply lines.
2. The power supply control circuit according to claim 1, further comprising:
   a potential selection switch coupled to the first coupling node and the second coupling node and configured to select and output the first potential or the second potential based on a control signal from the controller.

3. The power supply control circuit according to claim 2, wherein an absolute value of the second potential is larger than an absolute value of the first potential, and
the controller:
controls the potential selection switch to select the second potential when an absolute value of an output voltage of the capacitor increases; and
selects the first potential when the absolute value of the output voltage of the capacitor decreases.

4. The power supply control circuit according to claim 2, wherein
the potential selection switch includes:
a first potential selection transistor of a first conductivity type; and
a second potential selection transistor of a second conductivity type different from the first conductivity type,
a source of the first potential selection transistor is coupled to one of the first coupling node and the second coupling node which has a smaller absolute value of a potential,
a source of the second potential selection transistor is coupled to one of the first coupling node and the second coupling node which has a larger absolute value of a potential, and
a potential of a selected-potential output node to which drains of the first and second potential selection transistors are coupled in common is output to the controller as a selected potential.

5. The power supply control circuit according to claim 4, wherein
the control signal is input to gates of the first and second potential selection transistors in the potential selection switch, and
the power supply control switch is on/off-controlled based on the control signal.

6. The power supply control circuit according to claim 2, wherein
the power supply control switch includes a switch transistor,
the controller includes:
a first transistor coupled in series to a first resistor between the first and second power supply lines and having a gate to which an output node of the potential selection switch is coupled, and
a second transistor coupled in series to a second resistor between the first and second power supply lines and having a gate to which a coupling node between the first resistor and the first transistor is coupled, and
the control signal is extracted from a coupling node between the second resistor and the second transistor and is output to a gate of the switch transistor and the potential selection switch.

7. The power supply control circuit according to claim 6, wherein
the first resistor is coupled to a power supply line on a higher potential side in the first and second power supply lines,
the second resistor and the switch transistor are coupled to a power supply line on a lower potential side in the first and second power supply lines,
the switch transistor and the first transistor are n-channel metal-oxide-semiconductor transistors, and
the second transistor is a p-channel metal-oxide-semiconductor transistor.

8. The power supply control circuit according to claim 6, wherein
the first resistor is coupled to a power supply line on a lower potential side in the first and second power supply lines,
the second resistor and the switch transistor are coupled to a power supply line on a higher potential side in the first and second power supply lines,
the switch transistor and the first transistor are p-channel metal-oxide-semiconductor transistors, and
the second transistor is an n-channel metal-oxide-semiconductor transistor.

9. The power supply control circuit according to claim 2, wherein
the power supply control switch includes a switch transistor,
the controller includes a first transistor coupled in series to a first resistor between the first and second power supply lines and having a gate to which an output node of the potential selection switch is coupled, and
the control signal is extracted from a coupling node between the first resistor and the first transistor and is output to a gate of the switch transistor and the potential selection switch.

10. The power supply control circuit according to claim 9, wherein
the first resistor is coupled to a power supply line on a higher potential side in the first and second power supply lines,
the switch transistor is a p-channel metal-oxide-semiconductor transistor, and
the first transistor is an n-channel metal-oxide-semiconductor transistor.

11. The power supply control circuit according to claim 9, wherein
the first resistor is coupled to a power supply line on a lower potential side in the first and second power supply lines,
the switch transistor is an n-channel metal-oxide-semiconductor transistor, and
the first transistor is a p-channel metal-oxide-semiconductor transistor.

12. The power supply control circuit according to claim 1, wherein
the plurality of power generation cells are each a solar cell element, and
the energy harvester is a solar cell module.

13. The power supply control circuit according to claim 1, wherein
the load is a wireless communication module.

14. An energy harvesting device comprising:
an energy harvester;
a capacitor configured to store power from the energy harvester in which a plurality of power generation cells are coupled in series, and supply stored power to a load; and
a power supply control circuit including:
a power supply control switch provided between the capacitor and the load and configured to select whether or not to supply the stored power in the capacitor to the load; and
a controller configured to control the power supply control switch based on a first potential extracted from a first coupling node of the plurality of power generation cells and a second potential extracted from a second coupling node different from the first coupling node, wherein the capacitor is coupled between first and second power supply lines, and the power supply control switch and the load are coupled in series between the first and second power supply lines.

15. A control method of an energy harvesting device comprising:
- storing, by a capacitor, power from the energy harvester in which a plurality of power generation cells are coupled in series;
- selecting, by a power supply control switch provided between a load and the capacitor, whether or not to supply stored power in the capacitor to the load; and
- controlling, by a controller, the power supply control switch based on a first potential extracted from a first coupling node of the plurality of power generation cells and a second potential extracted from a second coupling node different from the first coupling node,
- wherein the capacitor is coupled between first and second power supply lines, and the power supply control switch and the load are coupled in series between the first and second power supply lines.

\* \* \* \* \*